US009319977B2

(12) United States Patent
Nayak et al.

(10) Patent No.: US 9,319,977 B2
(45) Date of Patent: Apr. 19, 2016

(54) WIRELESS SYSTEM SELECTION FACTORING RF RESOURCE AVAILABILITY IN DUAL ACCESS PHONES

(71) Applicant: QUALCOMM Incorporated, San Diego, CA (US)

(72) Inventors: Shivank Nayak, San Diego, CA (US); Francis Ming-Meng Ngai, Louisville, CO (US); Reza Shahidi, San Diego, CA (US); Qin Frantti, San Diego, CA (US); Gadigeppa Malagund, Haveri (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/458,550

(22) Filed: Aug. 13, 2014

(65) Prior Publication Data

US 2015/0282059 A1    Oct. 1, 2015

Related U.S. Application Data

(60) Provisional application No. 61/971,052, filed on Mar. 27, 2014, provisional application No. 61/982,941, filed on Apr. 23, 2014.

(51) Int. Cl.
*H04W 48/18* (2009.01)
*H04W 88/06* (2009.01)
*H04W 60/00* (2009.01)

(52) U.S. Cl.
CPC .............. *H04W 48/18* (2013.01); *H04W 88/06* (2013.01); *H04W 60/005* (2013.01)

(58) Field of Classification Search
CPC .................................................... H04W 48/18

USPC ........................................................ 455/452.1
See application file for complete search history.

(56) References Cited

U.S. PATENT DOCUMENTS 7,912,497 B2    3/2011    Isidore et al.
2012/0142308 A1*    6/2012    Lee et al. .................. 455/404.1
(Continued)

FOREIGN PATENT DOCUMENTS

EP    2605562 A2    6/2013
GB    2381418 A    4/2003
(Continued)

OTHER PUBLICATIONS

International Search Report and Written Opinion—PCT/US2015/022552—ISA/EPO—Jul. 3, 2015.

*Primary Examiner* — Michael Neff
(74) *Attorney, Agent, or Firm* — The Marbury Law Group, PLLC

(57) ABSTRACT

Methods, devices, and systems embodiments enable management of service preemption of at least one of a plurality of subscriptions that utilize a plurality of radio-frequency (RF) chains on a multi-Subscriber-Identity-Module, multi-active communication device in a manner that can accommodate a variety of different RF hardware components and configurations. Various embodiments provide methods implemented by a processor to manage service preemption. In response to detecting that a service of a second subscription initiated on a first RF chain is or will preempt a service of a first subscription that is also serviced by the first RF chain, the processor may determine whether there is a similar service on a second RF chain that may be used as a substitute for the first subscription's preempted service and, when available, the processor may configure the first subscription to begin utilizing the substitute service until the first RF chain is available.

25 Claims, 9 Drawing Sheets

(56) References Cited

U.S. PATENT DOCUMENTS

| | | |
|---|---|---|
| 2013/0005394 A1 | 1/2013 | Geary et al. |
| 2013/0029720 A1 | 1/2013 | Clevorn |
| 2013/0150013 A1 | 6/2013 | Liu et al. |
| 2013/0329639 A1 | 12/2013 | Wietfeldt et al. |
| 2014/0080485 A1* | 3/2014 | Park ............... 455/436 |

FOREIGN PATENT DOCUMENTS

| | | |
|---|---|---|
| WO | 2013124709 A1 | 8/2013 |
| WO | 2013155212 A1 | 10/2013 |

* cited by examiner

| SIM # (Service) | Idle Operations on SIM 1 and SIM 2 | | SIM2 on Voice Call | | SIM1 on LTE Data Call | | SIM1 on Voice Call | |
|---|---|---|---|---|---|---|---|---|
| | RF Chain 1 | RF Chain 2 | RF Chain 1 | RF Chain 2 | RF Chain 1 | RF Chain 2 | RF Chain 1 | RF Chain 2 |
| SIM-1 (Voice) | | 1xCDMA | | 1xCDMA | | 1xCDMA | | 1xCDMA |
| SIM-1 (Data) | LTE | | | DO | LTE | | LTE | |
| SIM-2 (Voice) | GSM | | GSM | | | GSM | GSM | |
| SIM-2 (Data) | GSM | | GSM | | | GSM | GSM | |

FIG. 7

WIRELESS SYSTEM SELECTION FACTORING RF RESOURCE AVAILABILITY IN DUAL ACCESS PHONES

RELATED APPLICATIONS

This application claims the benefit of priority to U.S. Provisional Patent Application No. 61/971,052 entitled "Wireless System Selection Factoring RF Resource Availability in Dual Access Phones" filed Mar. 27, 2014, and U.S. Provisional Patent Application No. 61/982,941 entitled "Wireless System Selection Factoring RF Resource Availability in Dual Access Phones" filed Apr. 23, 2014. The entire contents of both applications are hereby incorporated by reference.

BACKGROUND

Some new designs of mobile communication devices—such as smart phones, tablet computers, and laptop computers—include two or more Subscriber Identity Module ("SIM") cards that provide users with access to multiple separate mobile telephony networks. Examples of mobile telephony networks include GSM, TD-SCDMA, CDMA2000, and WCDMA. Example mobile communication devices that include multiple SIMs include mobile phones, laptop computers, smart phones, and other mobile communication devices that are configured to connect to multiple mobile telephony networks. A mobile communication device that includes a plurality of SIMs and connects to two or more separate mobile telephony networks using one or more separate radio frequency ("RF") chains/resources is termed a "multi-SIM-multi-active" or "MSMA" communication device. An example MSMA communication device is a "dual-SIM-dual-active" or "DSDA" communication device, which includes two SIM cards/subscriptions that utilize two separate RF chains to communicate with two separate mobile telephony networks.

SUMMARY

Various embodiments include a method implemented on a multi-Subscriber-Identity-Module (SIM), multi-active communication device for managing services of at least one of a plurality of subscriptions that utilize a plurality of radio-frequency (RF) chains to manage service preemption on the RF chains in a manner that can accommodate a variety of different RF hardware components and configurations. In some embodiments, a determination may be made regarding whether a service of a second subscription that is associated with a first RF chain is preempting or will preempt a service of a first subscription on the first RF chain. In response to determining that a service of the second subscription that is associated with the first RF chain is preempting or will preempt a service of the first subscription on the first RF chain, a determination may be made regarding whether there is another service on a second RF chain that is available as a substitute for the preempted service of the first subscription. In response to determining that there is another service on the second RF chain that is available as a substitute for the preempted service of the first subscription, the first subscription may be configured to acquire the substitute service on the second RF chain.

Various embodiments may have different data services from each of the first RF chain and the second RF chain received by the first subscription, and the first subscription may receive voice service from the second RF chain.

Various embodiments may include determining whether the preempted service of the first subscription may resume on the first RF chain. In response to determining that the preempted service of the first subscription may resume on the first RF chain, the first subscription may be configured to reacquire the preempted service on the first RF chain.

Various embodiments may include configuring the first subscription to reacquire the preempted service on the first RF chain by waiting for a predetermined period of time in response to determining that the preempted service of the first subscription may resume on the first RF chain, determining whether the preempted service has or will become preempted again after waiting for the predetermined period of time, and configuring the first subscription to reacquire the preempted service on the first RF chain in response to determining that the preempted service is not and will not become preempted again after waiting for the predetermined period of time.

Various embodiments may include determining whether there is another service on a second RF chain that is available as a substitute for the preempted service of the first subscription by determining an operational state for each of the first RF chain and the second RF chain and performing a lookup in a table of services available on the second RF chain based on the operational states of the first RF chain and the second RF chain and the services associated with the second RF chain.

Various embodiments may include determining whether there is another service associated with the second RF chain that is available as a substitute for the preempted service of the first subscription based on the table lookup. In response to determining that there is another service associated with the second RF chain that is available as a substitute for the preempted service of the first subscription based on the table lookup, the first subscription may be configured to acquire the substitute service on the second RF chain.

Various embodiments may include determining whether there is another service associated with the second RF chain that is available as a substitute for the preempted service of the first subscription based on the table lookup and determining whether the second RF chain is already configured to provide the substitute service. In response to determining that there is another service associated with the second RF chain that is available as a substitute for the preempted service of the first subscription based on the table lookup and the second RF chain is already configured to provide the substitute service, the first subscription may be configured to acquire the substitute service on the second RF chain.

Various embodiments may include determining whether the service of the second subscription that is associated with a first RF chain is estimated to preempt the service of the first subscription on the first RF chain for longer than a time duration threshold in response to determining that the second RF chain is not already configured to provide the substitute service. In response to determining that the service of the second subscription that is associated with a first RF chain is estimated to preempt the service of the first subscription on the first RF chain for longer than the time duration threshold, the first subscription may be configured to acquire the substitute service on the second RF chain.

Further embodiments may include a mobile communication device having a processor configured with processor-executable software instructions to perform various operations corresponding to the methods discussed above.

Further embodiments may include a mobile communication device having various means for performing functions corresponding to the method operations discussed above.

Further embodiments may include a non-transitory processor-readable storage medium having stored thereon processor-executable instructions configured to cause a processor of a mobile communication device to perform various operations corresponding to the method operations discussed above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 7 is an example data table for use in determining whether there is another service associated with a second RF chain that may serve as a substitute for a service preempted on a first RF chain according to some embodiments.

DETAILED DESCRIPTION

Figure 1:
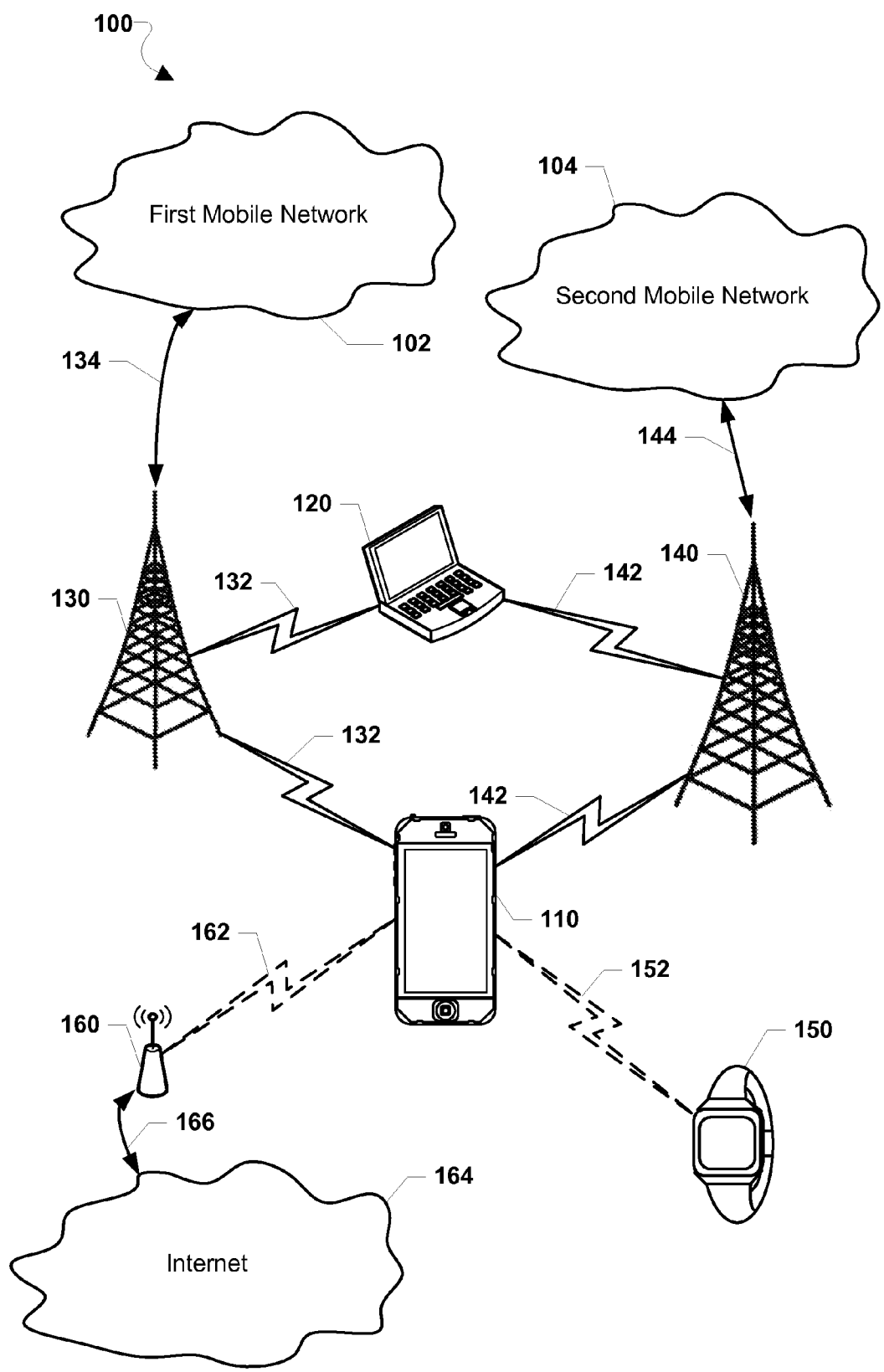
FIG. 1 is a communication system block diagram of mobile telephony networks suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term "multi-SIM communication device" refers to any one or all of cellular telephones, smart phones, personal or mobile multi-media players, personal data assistants, laptop computers, tablet computers, smart books, palm-top computers, wireless electronic mail receivers, multimedia Internet-enabled cellular telephones, wireless gaming controllers, and similar personal electronic devices that include a plurality of SIM cards, a programmable processor, memory, and circuitry for connecting to at least two mobile communication network. Various embodiments may be useful in mobile communication devices, such as smart phones, and so such devices are referred to in the descriptions of various embodiments. However, the embodiments may be useful in any electronic devices that may individually maintain at least two subscriptions and at least two RF chains, which may include one or more of antennae, radios, transceivers, etc.

As used herein, the terms "SIM," "SIM card," and "subscriber identification module" are used interchangeably to refer to a memory that may be an integrated circuit or embedded into a removable card, and that stores an International Mobile Subscriber Identity (IMSI), related key, and/or other information used to identify and/or authenticate a wireless device on a network and enable a communication service with the network. Because the information stored in a SIM enables the wireless device to establish a communication link for a particular communication service with a particular network, the terms "SIM" and "subscription" are used interchangeably and are used herein as a shorthand reference to refer to the communication service associated with and enabled by the information stored in a particular SIM as the SIM and the communication network, as well as the services and subscriptions supported by that network, correlate to one another.

As described, current MSMA communication devices include multiple SIMs/subscriptions that may utilize radio-frequency (RF) chains simultaneously. In some newer MSMA communication device designs, a variety of different RF modems and radios may be implemented, and the exact combination of RF chain components implemented on a particular device cannot be known in advance by operating system developers, application developers, and chipset developers. Consequently, different communication subscriptions may receive service from networks via a variety of different RF chain hardware. Some RF chains may service more than one subscription. For example, on a particular make and model DSDA communication device, a first subscription may place a voice call on a first RF chain using a 1×CDMA radio access technology (RAT) or a data call on the first RF chain using an Evolution-Data Optimized or "DO" RAT. The first subscription may also place a data call on a second RF chain using an LTE RAT. In a further example, the first subscription may share the second RF chain with a second subscription that is configured to place data and voice calls on the second subscription using a GSM RAT.

Because a subscription operating on a MSMA communication device may utilize multiple RF chains, these subscriptions are capable of receiving multiple services (e.g., both data and voice) simultaneously. In the above example, the first subscription may receive LTE data with the first RF chain and may simultaneously receive 1×CDMA voice with the second RF chain. However, for some makes and models of MSMA communication devices, a second subscription's activities on a shared RF chain may prevent or preempt a first subscription from receiving services on the shared RF chain, such as when the second subscription performs high-priority activities (e.g., placing a voice call).

In current MSMA communication devices, when a first subscription's service on a shared RF chain is preempted by a second subscription's activities, the first subscription's preempted service is suspended and may be forced into an out-of-service state until the shared RF chain is available at a later time, and the first subscription may continually attempt to reacquire the preempted service while the second subscription's high-priority activities are ongoing, even though the preempted service cannot be reestablished until the second subscription's activities end. As a result of the preemption, the first subscription may experience a significant, negative impact to its performance and throughput and may waste power and processing resources in fruitless attempts to reestablish the preempted service.

In overview, various embodiments provide methods implemented by a processor on a MSMA communication device to manage service preemption on RF chains shared by multiple subscriptions in a manner that can accommodate a variety of different RF hardware components and configurations. In particular, in response to detecting that a service (e.g., data or voice) of a second subscription initiated on a first RF chain is or will preempt a service of a first subscription that is also serviced by the first RF chain, the device processor may determine whether there is a similar service on a second RF chain that may be used as a substitute for the first subscription's preempted service. In response to determining that a substitute service is available on the second RF chain, the device processor may configure the first subscription to begin utilizing the substitute service until the first RF chain is available. At such time, the device processor may configure the first subscription to resume receiving service with the preempted service.

In some embodiments (e.g., as described with reference to FIG. 7), in order to identify whether there is a viable substitute service for the first subscription, the device processor may identify the operational states of the first RF chain and the second RF chain (e.g., what services/activities the first and second RF chains are currently servicing) and the services that are associated with the second RF chain. In some embodiments, the device processor may determine whether a substitute service is available on the second RF chain by performing a lookup in a table of services available on the second RF chain based on the operational states of the first and second RF chains and the services that are associated with the second RF chain. In some embodiments, the table of services available on the second RF chain may be stored in memory of the device, while in other embodiments the table of services available on the second RF chain may be implemented as a data structure within executable code of the modem communication manager. In some embodiments, the device processor may determine whether a substitute service is available on the second RF chain by performing a series of operations within executable code of the modem communication manager. In some embodiments, the device processor may determine whether overhead considerations justify switching to another service associated with a second RF chain that may serve as a substitute for a service preempted on a first RF chain. For example, the device processor may determine whether the duration of the preemption has exceeded or is estimated to exceed a time duration threshold representing a time period that justifies the overhead of service transfer in configuring the first subscription to acquire the substitute service on the second RF chain.

Various embodiments may be implemented within a variety of communication systems 100, such as at least two mobile telephony networks, an example of which is illustrated in FIG. 1. A first mobile network 102 and a second mobile network 104 typically each include a plurality of cellular base stations (e.g., a first base station 130 and a second base station 140). A first MSMA communication device 110 may be in communication with the first mobile network 102 through a cellular connection 132 to the first base station 130. The first MSMA communication device 110 may also be in communication with the second mobile network 104 through a cellular connection 142 to the second base station 140. The first base station 130 may be in communication with the first mobile network 102 over a wired connection 134. The second base station 140 may be in communication with the second mobile network 104 over a wired connection 144.

A second MSMA communication device 120 may similarly communicate with the first mobile network 102 through the cellular connection 132 to the first base station 130. The second MSMA communication device 120 may also communicate with the second mobile network 104 through the cellular connection 142 to the second base station 140. The cellular connections 132 and 142 may be made through two-way wireless communication links, such as 4G, 3G, CDMA, TDMA, WCDMA, GSM, and other mobile telephony communication technologies.

While the MSMA communication devices 110, 120 are shown connected to the mobile network 102 and, optionally, to the mobile network 104, in some embodiments (not shown), the MSMA communication devices 110, 120 may include two or more subscriptions to two or more mobile networks and may connect to those subscriptions in a manner similar to those described above.

In some embodiments, the first MSMA communication device 110 may optionally establish a wireless connection 152 with a peripheral device 150 used in connection with the first MSMA communication device 110. For example, the first MSMA communication device 110 may communicate over a Bluetooth® link with a Bluetooth-enabled personal computing device (e.g., a "smart watch"). In some embodiments, the first MSMA communication device 110 may optionally establish a wireless connection 162 with a wireless access point 160, such as over a Wi-Fi connection. The wireless access point 160 may be configured to connect to the Internet 164 or another network over a wired connection 166.

While not illustrated, the second MSMA communication device 120 may similarly be configured to connect with the peripheral device 150 and/or the wireless access point 160 over wireless links.

Figure 2:
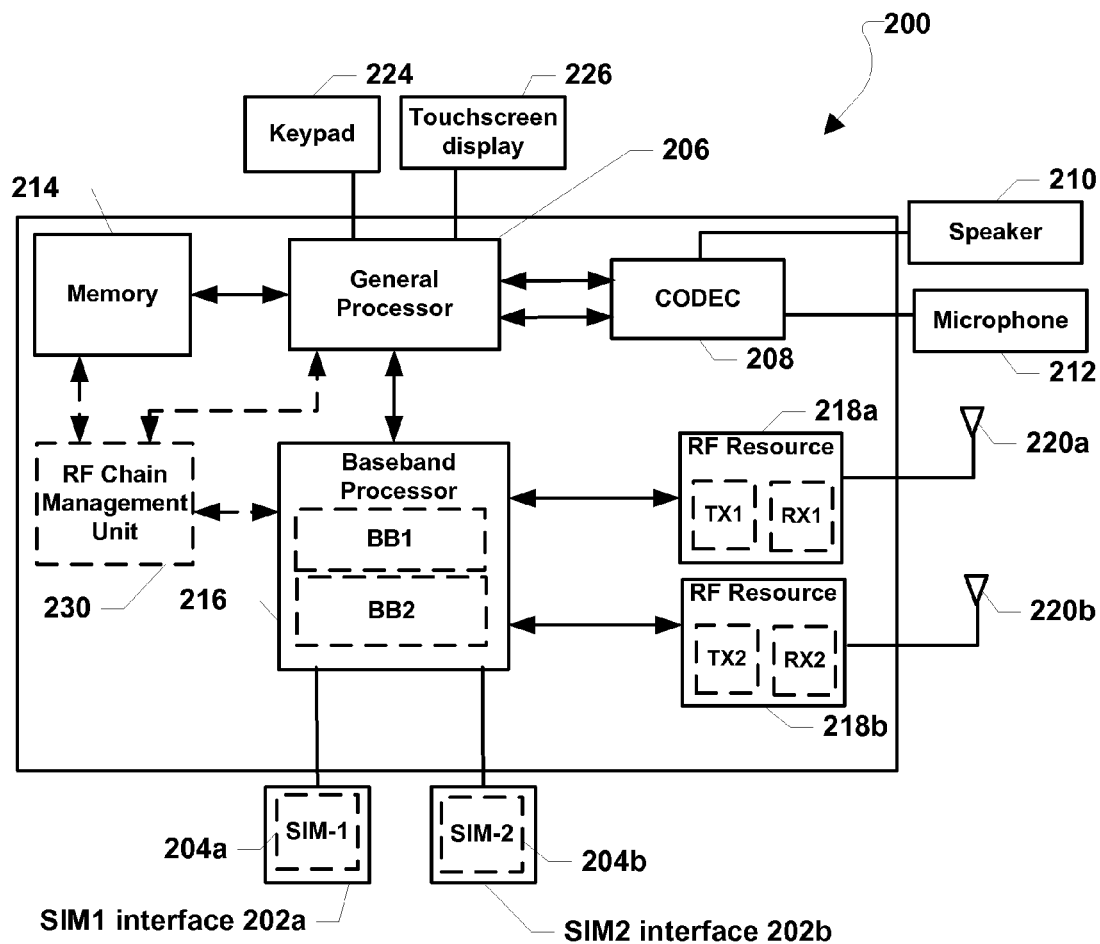
FIG. 2 is a component block diagram of a multi-SIM communication device according to various embodiments.

FIG. 2 is a functional block diagram of a MSMA communication device 200 suitable for implementing various embodiments. According to various embodiments, the MSMA communication device 200 may be similar to one or more of the MSMA communication devices 110, 120 as described with reference to FIG. 1. With reference to FIGS. 1 and 2, the MSMA communication device 200 may include a first SIM interface 202a, which may receive a first identity module SIM-1 204a that is associated with a first subscription. The MSMA communication device 200 may also include a second SIM interface 202b, which may receive a second identity module SIM-2 204b that is associated with a second subscription.

A SIM in various embodiments may be a Universal Integrated Circuit Card (UICC) that is configured with SIM and/or USIM applications, enabling access to GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. A SIM card may have a CPU, ROM, RAM, EEPROM and I/O circuits. An Integrated Circuit Card Identity (ICCID) SIM serial number may be printed on the SIM card for identification. However, a SIM may be implemented within a portion of memory of the MSMA communication device, and thus need not be a separate or removable circuit, chip, or card.

A SIM used in various embodiments may store user account information, an IMSI a set of SIM application toolkit (SAT) commands and other network provisioning information, as well as provide storage space for phone book database of the user's contacts. As part of the network provisioning information, a SIM may store home identifiers (e.g., a System Identification Number (SID)/Network Identification Number (NID) pair, a Home PLMN (HPLMN) code, etc.) to indicate the SIM card network operator provider.

The MSMA communication device 200 may include at least one controller, such as a general purpose processor 206, which may be coupled to a coder/decoder (CODEC) 208. The CODEC 208 may in turn be coupled to a speaker 210 and a microphone 212. The general purpose processor 206 may also be coupled to at least one memory 214. The memory 214 may be a non-transitory computer readable storage medium that stores processor-executable instructions. For example, the instructions may include routing communication data relating to the first or second subscription through a corresponding baseband-RF resource chain.

The memory 214 may store an operating system (OS), as well as user application software and executable instructions. The memory 214 may also store application data, such as an array data structure.

The general purpose processor 206 and the memory 214 may each be coupled to at least one baseband modem processor 216. Each SIM in the MSMA communication device 200 (e.g., the SIM-1 202a and/or the SIM-2 202b) may be associated with a baseband-RF resource chain. A baseband-RF resource chain may include the baseband modem processor 216, which may perform baseband/modem functions for communications on at least one SIM, and may include one or more amplifiers and radios, referred to generally herein as RF resources or RF chains (e.g., RF resource 218a and RF resource 218b). In some embodiments, baseband-RF resource chains may share the baseband modem processor 216 (i.e., a single device that performs baseband/modem functions for all SIMs on the MSMA communication device). In other embodiments, each baseband-RF resource chain may include physically or logically separate baseband processors (e.g., BB1, BB2).

The RF resources 218a, 218b may each be transceivers that perform transmit/receive functions for the associated SIM of the MSMA communication device. The RF resources 218a, 218b may include separate transmit and receive circuitry, or may include a transceiver that combines transmitter and receiver functions (e.g., as described with reference to FIG. 3). The RF resources 218a, 218b may each be coupled to a wireless antenna (e.g., a first wireless antenna 220a and a second wireless antenna 220b). The RF resources 218a, 218b may also be coupled to the baseband modem processor 216.

In some embodiments, the general purpose processor 206, the memory 214, the baseband processor(s) 216, and the RF resources 218a, 218b may be included in the MSMA communication device 200 as a system-on-chip. In some embodiments, the first and second SIMs 204a, 204b and their corresponding interfaces 202a, 202b may be external to the system-on-chip. Further, various input and output devices may be coupled to components on the system-on-chip, such as interfaces or controllers. Example user input components suitable for use in the MSMA communication device 200 may include, but are not limited to, a keypad 224, a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive selection of a contact from a contact list or to receive a telephone number. As another example, the request to initiate the outgoing call may be in the form of a voice command received via the microphone 212. Interfaces may be provided between the various software modules and functions in the MSMA communication device 200 to enable communication between them, as is known in the art.

In some embodiments (not shown), the MSMA communication device 200 may include, among other things, additional SIM cards, SIM interfaces, a plurality of RF resources associated with the additional SIM cards, and additional antennae for connecting to additional mobile networks.

The MSMA communication device 200 may optionally include an RF chain management unit 230 configured to manage the services of the first and second SIMs 204a, 204b in the event that a service on an RF chain is or is about to be preempted (e.g., as described with reference to FIG. 3). In some embodiments, the RF chain management unit 230 may determine whether to configure a subscription to acquire service with a substitute service on a second RF chain in response to detecting that the subscription's service has been or will be preempted on a first RF chain. In some embodiments, the RF chain management unit 230 may be implemented within the general purpose processor 206. In other embodiments, the RF chain management unit 230 may be implemented as a hardware component separate (i.e., separate from the general purpose processor 206). In yet other embodiments, the RF chain management unit 230 may be implemented as a software application stored within the memory 214 and executed by the general purpose processor 206.

Figure 3:
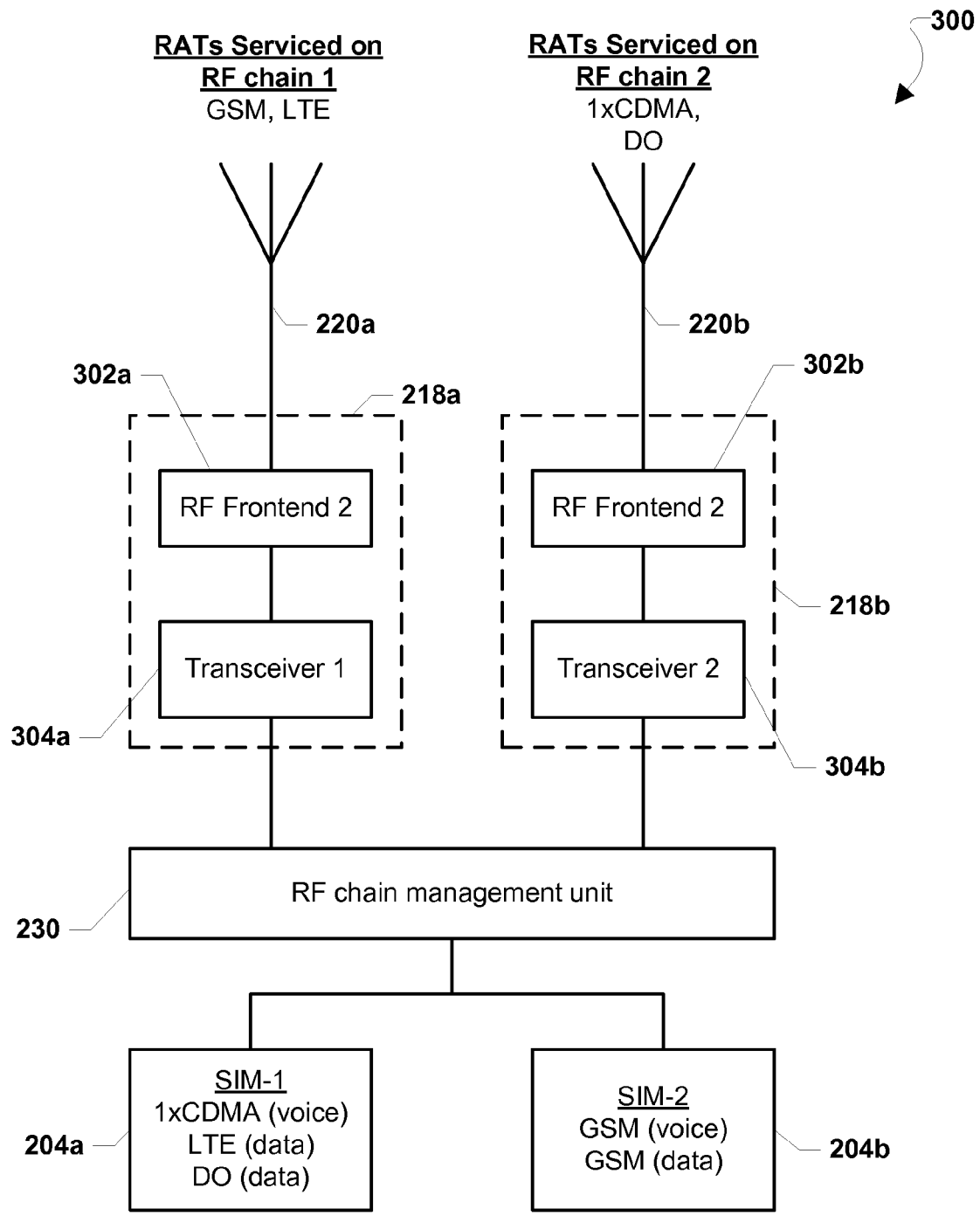
FIG. 3 is a component block diagram illustrating an example configuration of a first RF chain and a second RF chain, each configured to provide different services for a first subscription and/or a second subscription on a multi-SIM communication device according to various embodiments.

FIG. 3 illustrates a block diagram 300 of components in separate RF resources on a MSMA communication device 200, as described with reference to FIGS. 1 and 2 according to various embodiments.

With reference to FIGS. 1-3, for example, the RF resource 218a may include a transceiver 304a and an RF frontend 302a for communicating with one or more mobile networks (e.g., the mobile networks 102, 104). In particular embodiments, the transceiver 304a and/or the RF frontend 302a may format, encode, interleave data, modulate carrier signals with encoded data, and condition the modulated signal (e.g., by filtering, amplifying, and upconverting) to generate an RF modulated signal for transmission. The RF modulated signal may be transmitted, for example, to the first base station 130 via the first wireless antenna 220a, and the RF resource 218a may receive and decode RF signals via the first wireless antenna 220. The RF resource 218b may similarly include a transceiver 304b and an RF frontend 302b for sending and receiving RF signals via the second wireless antenna 220b.

The SIM-1 204a and the SIM-2 204b may be capable of maintaining various data and voice services via one or more RATs. For instance, the SIM-1 204a may place voice calls using a 1xCDMA RAT and may place data calls with either an LTE RAT or a DO RAT. The SIM-2 204b may place voice and data calls with a GSM RAT.

In the example illustrated in FIG. 3, the SIM-1 204a may be capable of utilizing different RATs to acquire different services via one or both of the RF resources 218a, 218b, simultaneously. Specifically, the SIM-1 204a may utilize the RF resource 218a to service LTE data calls/idling operations while simultaneously utilizing the RF resource 218b to service 1xCDMA voice calls/idling operations. On the other hand, the SIM-2 204b may solely utilize the RF resource 218a to service GSM voice and data calls and idling operations.

The SIM-2 204b may initiate a GSM voice call on the RF resource 218a. In some embodiments, the GSM voice call may have a high priority because maintaining the quality of the voice call may require the SIM-2 204b to have exclusive access to the RF resource 218a. As a result, the SIM-1 204a may be prevented from utilizing the RF resource 218a to receive LTE data (i.e., the LTE data service may be preempted by the GSM voice call).

Thus, in some embodiments, the RF chain management unit 230 may detect that the SIM-2 204b's activities on the RF resource 218a is or will preempt the LTE data service of the SIM-1 204a and, in response, may attempt to locate another service on the RF resource 218b that may serve as a substitute for LTE data service (e.g., as described with reference to FIG. 4).

Figure 4:
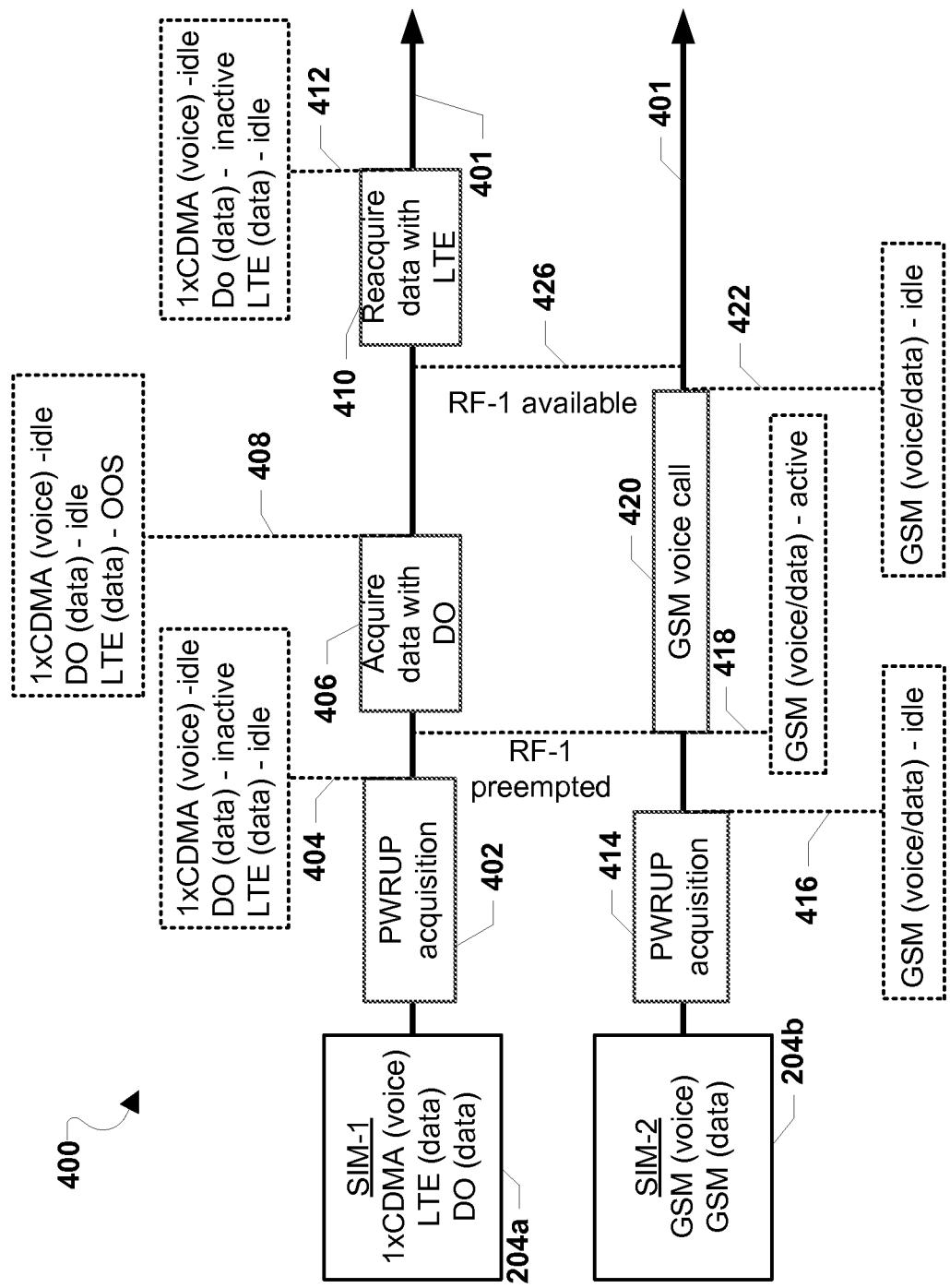
FIG. 4 is a timeline diagram illustrating preemption of an LTE service on a first RF chain when a GSM voice call service is initiated on the first RF chain.

FIG. 4 illustrates a timeline diagram 400. In particular, with reference to FIGS. 1-4, the timeline diagram 400 shows, over time 401, an example in which the RF chain management unit 230 configures the SIM-1 204a to acquire service with a substitute service on the RF resource 218b in response to detecting that the SIM-2 204b's activities are or will preempt the SIM-1 204a's data service on the RF resource 218a.

In the example illustrated in FIG. 4 and with reference to FIGS. 1-4, the SIM-1 204a may perform acquisitions during a power up (i.e., "PWRUP acquisition 402"), and as a result, may establish idle 1xCDMA voice services on the RF resource 218b and idle LTE data services on the RF resource 218a by time 404. The SIM-2 204b may similarly perform its own acquisitions during power up (i.e., "PWRUP acquisition 414") that may enable the SIM-2 204b to receive idle GSM voice and/or data services on the RF resource 218a by time 416.

At time 418, the SIM-2 204b may initiate a GSM voice call 420 on the RF resource 218a. As described, the GSM voice call 420 may require exclusive access to the RF resource 218a, preempting other services from occurring on the RF resource 218a while the GSM voice call 420 is ongoing.

In some embodiments, the RF chain management unit 230 may monitor the current state and/or condition of the RF resources 218a, 218b to determine whether a service has been initiated that may preempt other services. Thus, for example, the RF chain management unit 230 may detect that the GSM voice call 420 is initiated at the time 418 and that, as a result, the RF resource 218a is not or will not be available for the SIM-1 204a to receive LTE data service from the RF resource 218a while the GSM voice call 420 is ongoing. In response, the RF chain management unit 230 may configure the SIM-1 204a to acquire data services with the DO RAT in operations 406. Thus, by time 408, the SIM-1 204a may receive, via the RF resource 218b, idle voice service on the 1xCDMA RAT and idle data service on the DO RAT, and the SIM-204a may receive no service on the LTE RAT via the RF resource 218a. In other words, while the GSM voice call 420 on the RF resource 218a is ongoing, the SIM-1 204a may be configured to receive data services with the DO RAT as a substitute for receiving data service with the LTE RAT.

At time 422, the GSM voice call 420 may end, and the RF chain management unit 230 may determine that the RF resource 218a is available/no longer preempted at time 426. At such time, the RF chain management unit 230 may configure the SIM-1 204a to reacquire data service with the LTE RAT on the RF resource 218a in operations 410, and by time 412, the SIM-1 204a may be configured to receive voice service from the 1xCDMA via the RF resource 218b and may receive data service with the LTE RAT on the RF resource 218a.

Figure 5:
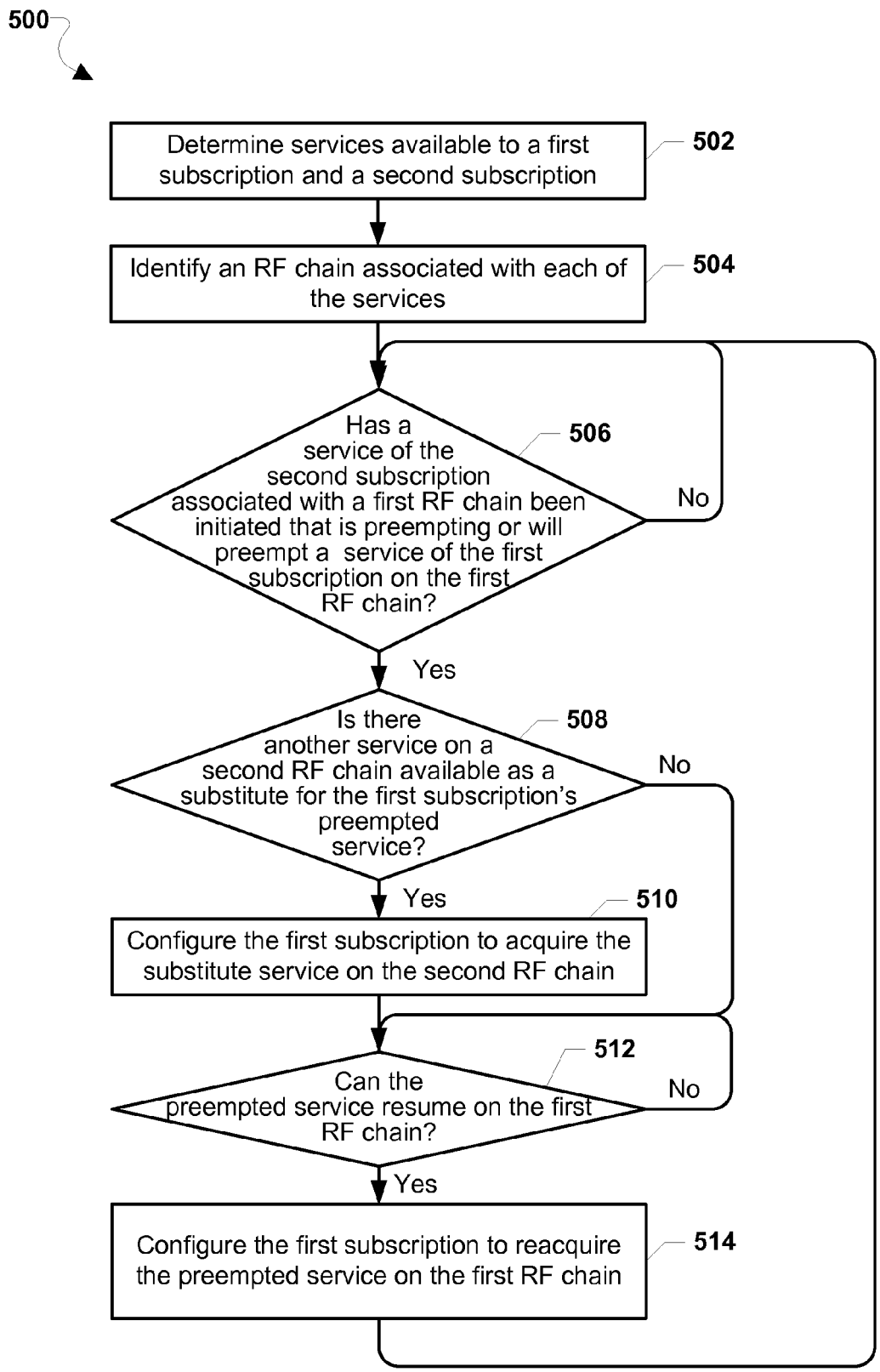
FIG. 5 is a process flow diagram illustrating a method for acquiring a substitute service on a second RF chain for a first subscription in response to determining that a second service of a second subscription is or will preempt the first service on the first RF chain, according to various embodiments.

FIG. 5 illustrates a method 500 that may be implemented by a processor (e.g., the general purpose processor 206 of FIG. 2, the baseband modem processor 216, the RF chain management unit 230, a separate controller, and/or the like) on a MSMA communication device (e.g., the MSMA communication device 200 of FIG. 2) that supports a plurality of subscriptions and one or more shared RF chains in plurality of RF chains for configuring a first subscription to acquire a substitute service on a second RF chain.

With reference to FIGS. 1-5, the device processor may begin performing the operations of method 500 in block 502 by determining services available to a first subscription and a second subscription. In an example (e.g., as described with reference to FIGS. 3-4), the first subscription (e.g., the SIM-1 204a) may receive a voice service with a 1xCDMA RAT and a data service on either an LTE RAT or a DO RAT. The second subscription (e.g., the SIM-1 204a) may receive both voice and data services with a GSM RAT.

In block 504, the device processor may identify an RF chain associated with each of the services determined in block 502. Thus, in the above example, the device processor may determine that a first RF chain handles LTE data services for the first subscription and GSM voice/data services for the second subscription, while a second RF chain handles 1xCDMA voice services and DO data services for the first subscription.

The hardware configuration and the RAT and services supported by each RF chain installed in a particular device are determined by the manufacturer, and thus is set when the device is made. In order to address different price points in different markets (which may have different cellular networks available), manufacturers may use different chip sets and different RF chain components for different models. Thus, while the system and application developer will not know the particular configuration that is in each phone and therefore must develop software to work with a variety of RF hardware component combinations, the specific RF chains installed in the device will not vary after the device is manufactured. Thus the RF chains associated with each service may be determined one time (such as upon initial registration or upon insertion of a provisioned SIM). Consequently, the operations of block 504 may be performed once (e.g., upon detecting a new SIM, upon power-up, etc.), with the results stored in memory (e.g., 214).

In determination block 506, the device processor may determine whether a service of the second subscription that is associated with the first RF chain has been initiated (or is about to be initiated as when the user begins to dial a phone number) such that the initiated service is preempting or will soon preempt a service of the first subscription also serviced by the first RF chain. In some embodiments, the device processor may make this determination by monitoring the state and/or condition of the RF chains to determine when an initiated service requires or may require exclusive access to an RF chain (e.g., the GSM voice call 420).

In response to determining that the such a preempting service of the second subscription has not been initiated on the first RF chain (i.e., determination block 506="No"), the device processor may continue performing the operations in determination block 506 in a loop monitoring for when a service of the second subscription is initiated and is preempting or will preempt a service of the first subscription on the first RF chain.

In response to determining that a service of the second subscription associated with the first RF chain has been initiated and is preempting or will preempt a service of the first subscription on the first RF chain (i.e., determination block 506="Yes"), the device processor may determine whether there is another service on a second RF chain that is available as a substitute for the first subscription's preempted service, in determination block 508. In some embodiments (e.g., as described with reference to FIGS. 6-7), the device processor may reference a table that includes services that may serve as a substitute to a preempted. In other embodiments, the device processor may follow decision trees that include tests, checks, conditionals, and/or virtually any other data structure that may enable the device processor to identify a substitute service for a preempted service. For example, the device processor may determine whether the first subscription is capable of receiving similar services (e.g., DO data services) on a first RF chain as a substitute for preempted LTE data services.

In response to determining that there is not another service on the second RF chain that is available as a substitute for the first subscription's preempted service (i.e., determination block 508="No"), the device processor may begin performing the operations in determination block 512 without configuring the first subscription to acquire another service as a substitute for its preempted service. In other words, when there is no substitute service, the preempted service of the first subscription may remain suspended or out-of-service until the first RF chain is available again.

In response to determining that there is another service on the second RF chain that is available as a substitute for the first subscription's preempted service (i.e., determination block 508="Yes"), the device processor may configure the first subscription to acquire the substitute service on the second RF chain, in block 510. For example, the device processor may configure the first subscription to begin receiving data service with a DO RAT on the second RF chain (e.g., RF resource 218b). Thus, by enabling the first subscription to receive substitute services, the first subscription's overall performance and throughput may be maintained until the first subscription's preempted services may be resumed.

Regardless of whether the device processor configures the first subscription to acquire the substitute service on the second RF chain in block 510 or whether the device processor determines that there is not a substitute service in determination block 508, the device processor may determine whether the preempted service is able to resume on the first RF chain, in determination block 512. In some embodiments, the device processor may monitor the first RF chain to determine when the service of the second subscription no longer needs exclusive access to the first RF chain, such as when a GSM voice call has ended.

In response to determining that the preempted service of the first subscription is not able to resume on the first RF chain (i.e., determination block 512="No"), the device processor may continue determining whether the preempted service is able to resume on the first RF chain in determination block 512 in a loop.

In response to determining that the preempted service of the first subscription is able to resume on the first RF chain (i.e., determination block 512="Yes"), the device processor may configure the first subscription to reacquire the preempted service on the first RF chain in block 514. In an example (e.g., as described with reference to FIGS. 3-4), the first subscription may reacquire LTE data services on the first RF chain from DO data services acquired from the second RF chain.

The device processor may repeat the above operations in determination block 506 of the method 500 in a loop by determining whether a service of the second subscription on the first RF chain has been initiated, thereby preempting a service of the first subscription.

While the above descriptions refer to a first subscription and a second subscription, the use of a "first" and "second" subscription is used only for ease of description and is not intended to narrow the scope of the disclosure. Therefore, it is anticipated that the operations of the method 500 may be performed for any subscription on the MSMA communication device that receives different services from different RF chains as described. As such, in some embodiments, a first subscription at one time may be a second subscription at a later time—and vice versa—depending on the conditions and states of the subscriptions and RF chains.

In some embodiments of the operations of the method 500, the device processor may wait to configure the first subscription to reacquire preempted services to ensure that those preempted services may be resumed without a high likelihood of being preempted in the near future.

In some embodiments in which a service on the second subscription (e.g., a GSM voice call) preempts a service of the first subscription (e.g., LTE data services), the device processor may perform the following operations to ensure that the preempted service is not resumed prematurely in response to determining that the preempted services may no longer be preempted. In such embodiments, the first subscription may utilize a substitute, non-preferred service (e.g., DO data services) while the preferred service (e.g., LTE data) is preempted.

In an example, for a second subscription GSM voice call that starts more than a predetermined period of time (e.g., four seconds) from the end of the previous second subscription GSM voice call, the device processor may determine whether the first subscription's has received data services with an LTE RAT prior to the second subscription's GSM voice call. In the event that the first subscription's data services are received with the LTE RAT prior to the second subscription's voice call, the device processor may set a flag, bit, or other indication as "TRUE." Specifically, when the second subscription performs back-to-back GSM voice calls, the status of the first subscription's data services may be checked once at the start of the first GSM voice call.

In response to detecting that the second subscription's GSM voice call has ended, the device processor may wait the predetermined time to determine whether there will be back-to-back GSM voice calls in order to prevent "ping-ponging" between LTE and DO. In other words, the device processor may wait to make sure the second subscription is not going to immediately start another GSM voice call, which may require the device processor to switch the first subscription's data service from LTE back to DO.

In response to determining that the GSM voice call has ended and that another GSM call has not been initiated for the predefined time, the device processor may configure the first subscription reacquire LTE data services in the event that the first subscription was receiving LTE data service before the first GSM voice call and in the event that the first subscription is not currently on a data call with the DO RAT to ensure any DO data services' ongoing data transfer is not impacted.

In response to determining that the GSM voice call has ended, that another GSM voice call has not been initiated for the predefined time, and that the first subscription is conducting a data call on DO and/or that the first subscription was using DO prior to the first GSM voice call, the device processor may wait to configure the first subscription to receive LTE data services, for example, based on the next scheduled BSR or the first subscription's network-provisioned D2L measurements.

Figure 6:
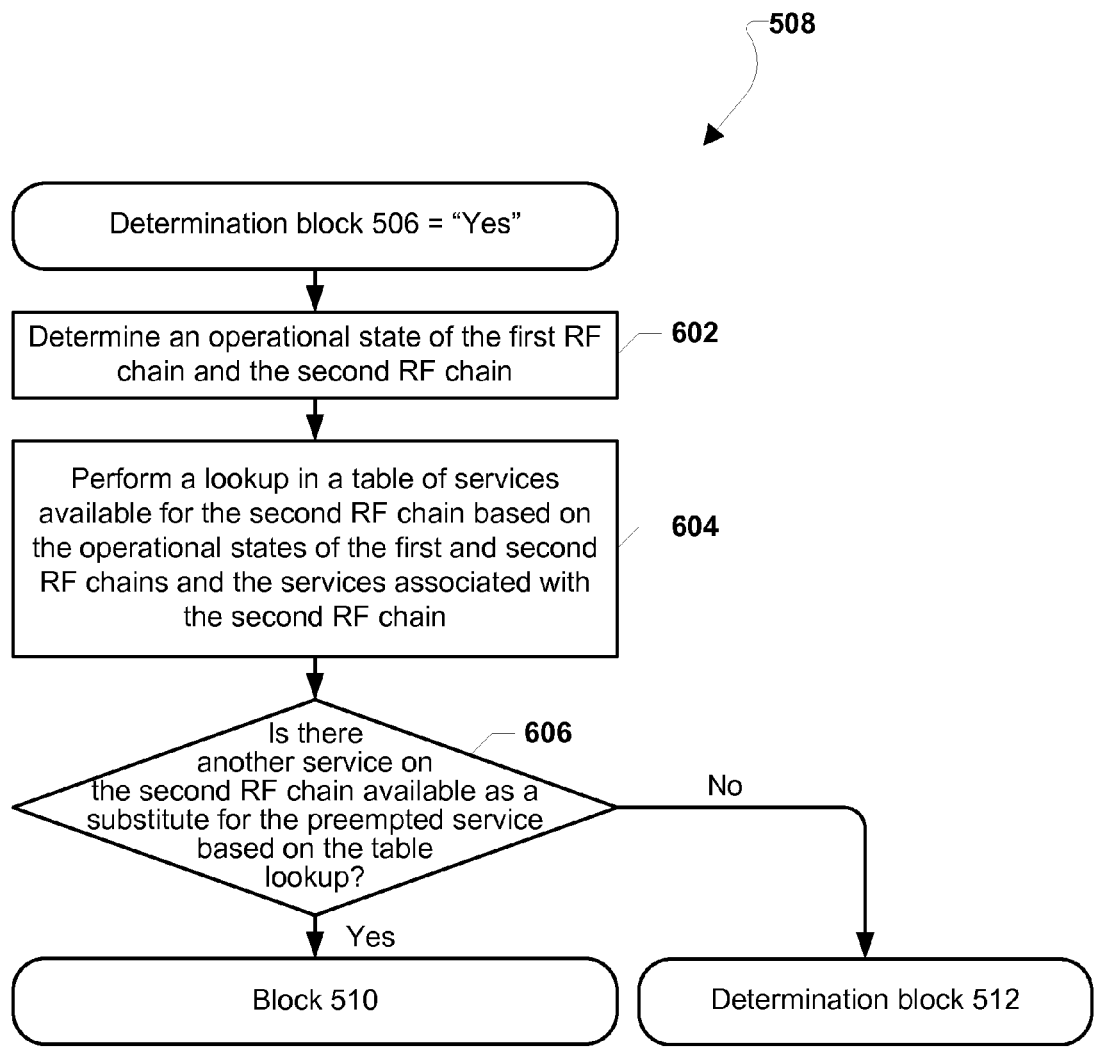
FIG. 6 is a process flow diagram illustrating an example of operations for determining whether there is another service associated with a second RF chain that may serve as a substitute for a service preempted on a first RF chain according to various embodiments.

FIG. 6 illustrates an example of operations that may be implemented in determination block 508 (refer to FIG. 5) by a processor (e.g., the general purpose processor 206 of FIG. 2, the baseband modem processor 216, the RF chain management unit 230, a separate controller, and/or the like) on a MSMA communication device (e.g., the MSMA communication device 200 of FIG. 2) that supports a plurality of subscriptions and a plurality of RF chains for determining whether there is a service that may serve as a substitute for a preempted service of the first subscription. Thus, in reference to FIGS. 1-6, the device processor may begin performing the operations of determination block 508 in response to determining that a service of the second subscription associated with a first RF chain has preempted or will preempt a service of the first subscription on the first RF chain (i.e., determination block 506="Yes").

In block 602, the device processor may identify an operational state of the first RF chain and the second RF chain, such as by determining the services that each of the RF chains are currently handling. For example, the first RF chain may be servicing a GSM voice call for the second subscription, and the second RF chain may be handling DO data services and 1×CDMA idling services for the first subscription.

In block 604, the device processor may perform a lookup in a table of services available on the second RF chain based on the operational states of the first and second RF chains and the services associated with the second RF chain. In other words, the device processor may utilize the operational states of the RF chains identified in block 602 as well as the services available to each subscription to determine the services on the second RF chain that may be available to the first subscription.

In some embodiments of the operations performed in block 604, the device processor may reference a data table 700 as illustrated in FIG. 7. With reference to FIGS. 1-7, the data table 700 may include entries for each RF chain based on the services that each RF chain is currently handling for the first and/or second subscriptions. For example, the device processor may determine that when the second subscription is on a voice call, the first RF chain may be dedicated to providing service solely to the second subscription, and the second RF chain may be capable of providing 1×CDMA voice services and DO data services for the first subscription.

In some embodiments, the data table 700 may be implemented in memory (e.g., the memory 214) as a data table within a database, a stored spreadsheet, a collection of application or system variables, or any other data structure capable of being stored, ordered, and/or modified on the MSMA communication device. In some embodiments, the data table 700 may be a representation of a series of conditional statements (e.g., if/else statements), switch statements, and/or various other logic implemented in software that may enable the device processor to determine the services that the first and/or second RF chains are capable of supporting for the first and second subscriptions, respectively, given the RF chains' current operational status (e.g., supporting a GSM voice call, etc.).

Some embodiments may not use a data table, and instead the device processor may determine whether a substitute service is available on the second RF chain in block 604 by performing a series of operations within executable code of the modem communication manager, such as a series of conditional statements (e.g., if/else statements), switch statements, and/or various other logic implemented in software that may enable the device processor to determine the services that the first and/or second RF chains are capable of supporting for the first and second subscriptions, respectively, given the RF chains' current operational status (e.g., supporting a GSM voice call, etc.).

In determination block 606, the device processor may determine whether there is another service on the second RF chain available as a substitute for the preempted service of the first subscription based on the table lookup performed in block 604. In other words, based on the table lookup, the device processor may determine whether the second RF chain is capable of providing services (e.g., DO data services) that may temporarily replace the preempted services on the first RF chain that are or will be preempted (e.g., LTE data services).

In response to determining that there is another service on the second RF chain that is available as a substitute for the first subscription's preempted service based on the table lookup (i.e., determination block 606="Yes"), the device processor may perform the operations in block 510 of the method 500 by configuring the first subscription to acquire the substitute service on the second RF chain.

In response to determining that there is no other service on the second RF chain that is available as a substitute for the first subscription's preempted service based on the table lookup (i.e., determination block 606="No"), the device processor may perform the operations in determination block 512 of the method 500 by determining whether the preempted service is able to resume on the first RF chain.

Figure 8:
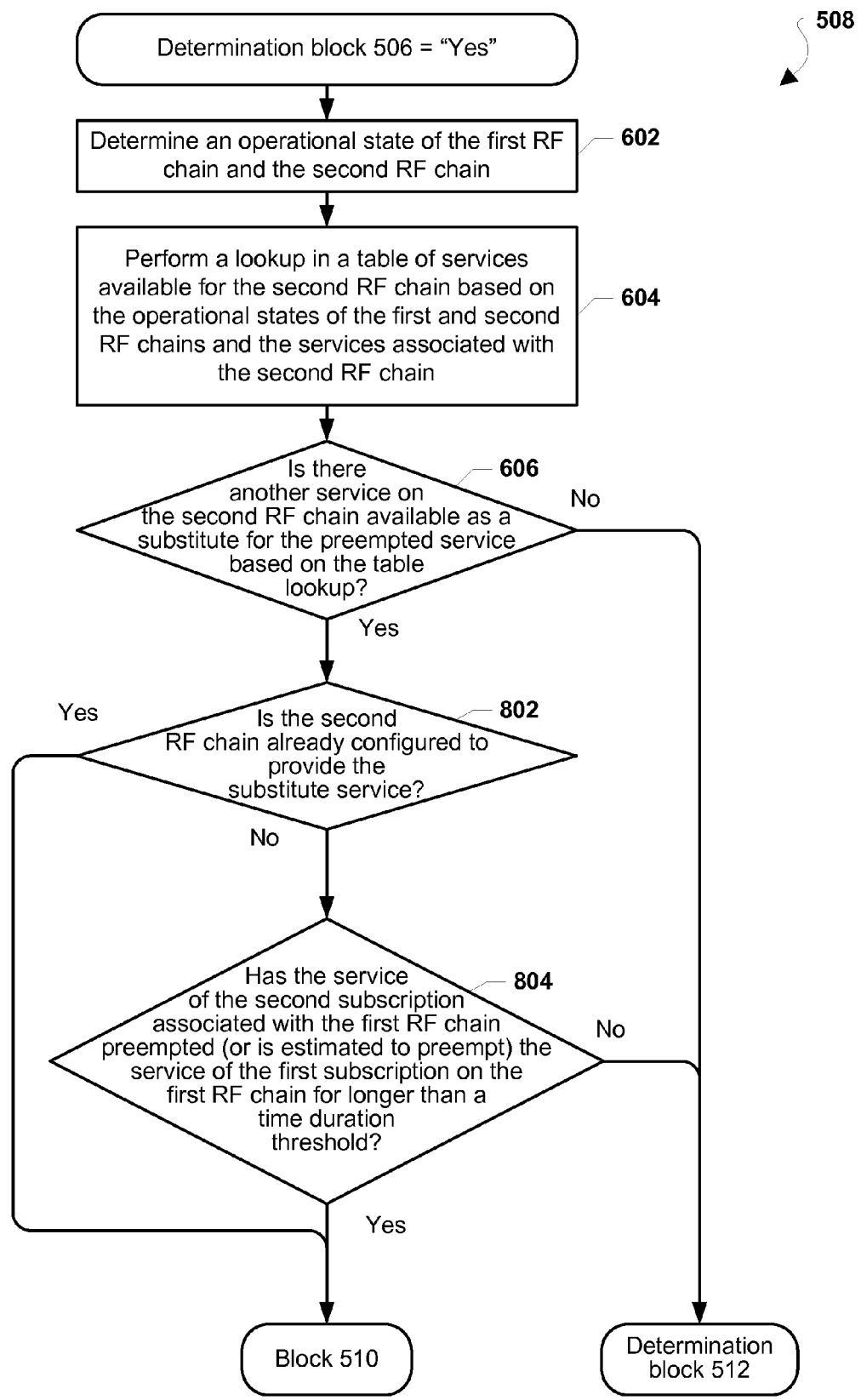
FIG. 8 is a process flow diagram illustrating an example of operations for determining whether overhead considerations justify switching to another service associated with a second RF chain that may serve as a substitute for a service preempted on a first RF chain according to various embodiments.

FIG. 8 illustrates an example of operations that may be implemented in determination block 508 (refer to FIG. 5) by a processor (e.g., the general purpose processor 206 of FIG. 2, the baseband modem processor 216, the RF chain management unit 230, a separate controller, and/or the like) on a MSMA communication device (e.g., the MSMA communication device 200 of FIG. 2) that supports a plurality of subscriptions and a plurality of RF chains for determining whether there is a service that may serve as a substitute for a preempted service of the first subscription. Thus, with reference to FIGS. 1-8, the device processor may begin performing the operations of determination block 508 in response to determining that a service of the second subscription associated with a first RF chain has preempted or will preempt a service of the first subscription on the first RF chain (i.e., determination block 506="Yes").

The device processor may perform operations of like numbered blocks implemented in determination block 508 as described (e.g., with reference to FIG. 6) to determine an operational state of the first RF chain and the second RF chain in block 602, perform a lookup in a table of services available for the second RF chain based on the operational states of the first and second RF chains and the services associated with the second RF chain in block 604, and determine whether there is another service on the second RF chain available as a substitute for the preempted service based on the table lookup in determination block 606.

In response to determining that there is another service on the second RF chain that is available as a substitute for the first subscription's preempted service based on the table lookup (i.e., determination block 606="Yes"), the device processor may determine whether the second RF chain is already configured to provide the substitute service, in determination block 802. For example, based on the operational state of the second RF chain determined in block 602, the device processor may determine whether the second RF chain is already configured to provide DO data services that may temporarily replace preempted LTE data services on the first RF chain.

In response to determining that the second RF chain is already configured to provide the substitute service (i.e., determination block 802="Yes"), the device processor may configure the first subscription to acquire the substitute service on the second RF chain in block 510 of the method 500 as described.

In response to determining that the second RF chain is not already configured to provide the substitute service (i.e., determination block 802="Yes"), the device processor may determine whether the service of the second subscription associated with the first RF chain estimated to preempt the service of the first subscription on the first RF chain for longer than a time duration threshold, in determination block 804. In various embodiments, a time duration threshold may be a value stored in a memory (e.g., the memory 214) representing a time period that justifies the overhead of service transfer involved in configuring the first subscription to acquire the substitute service on the second RF chain. By ensuring that the service of the first subscription is estimated to be preempted for at least the time duration threshold, the overhead associated with service transfer may be avoided for short duration preemption events (e.g., preemption less than the time duration threshold).

In response to determining that the service of the second subscription associated with the first RF chain is estimated to not preempt the service of the first subscription on the first RF chain for longer than a time duration threshold (i.e., determination block 804="No"), the device processor may determine whether the preempted service is able to resume on the first RF chain in determination block 512 of the method 500 as described.

In response to determining that the service of the second subscription associated with the first RF chain is estimated to preempt the service of the first subscription on the first RF chain for longer than a time duration threshold (i.e., determination block 804="Yes"), the device processor may configure the first subscription to acquire the substitute service on the second RF chain in block 510 of the method 500 as described.

It should be noted that references herein to first and second services, first and second SIMs, and first and second RF chains are arbitrary and for ease of description and reference purposes only. While the embodiment descriptions refer to the second service being preempted by an active communication of the first service, and continuing the second service using a second RF chain associated with a second SIM, the embodiments apply equally well when the circumstances and roles of the services, SIMs and RF chain are reversed.

Figure 9:
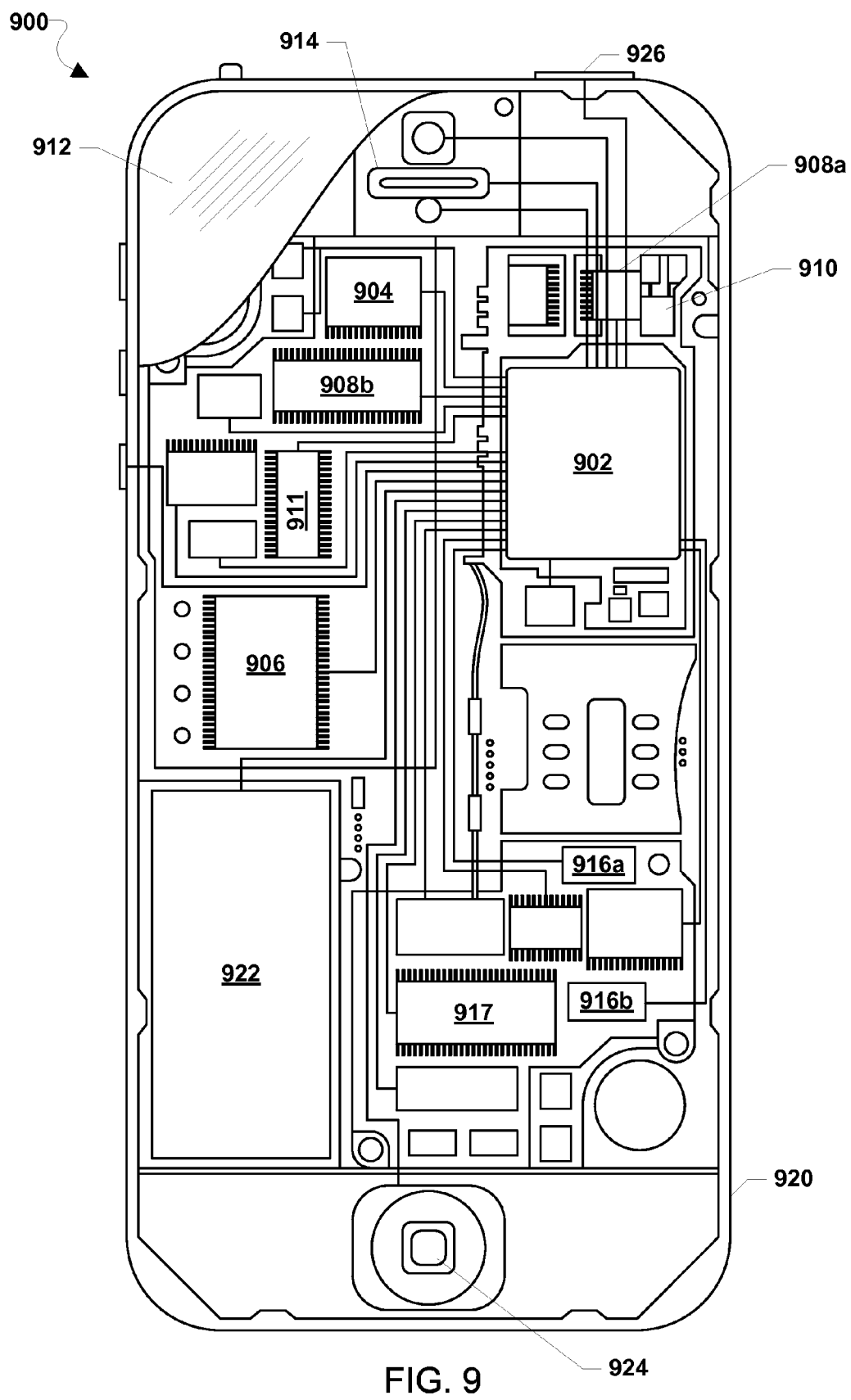
FIG. 9 is a component block diagram of a multi-SIM communication device suitable for implementing some embodiment methods.

Various embodiments may be implemented in any of a variety of MSMA communication devices, an example of which (e.g., MSMA communication device 900) is illustrated in FIG. 9. According to various embodiments, the MSMA communication device 900 may be similar to the MSMA communication devices 110, 120, 200 as described above with reference to FIGS. 1-3. As such, in various embodiments, the MSMA communication device 900 may implement the methods 500, 600, 800 (refer to FIGS. 5, 6, and 8).

With reference to FIGS. 1-9, the MSMA communication device 900 may include a processor 902 coupled to a touchscreen controller 904 and an internal memory 906. The processor 902 may be one or more multi-core integrated circuits designated for general or specific processing tasks. The internal memory 906 may be volatile or non-volatile memory, and may also be secure and/or encrypted memory, or unsecure and/or unencrypted memory, or any combination thereof. The touchscreen controller 904 and the processor 902 may also be coupled to a touchscreen panel 912, such as a resistive-sensing touchscreen, capacitive-sensing touchscreen, infrared sensing touchscreen, etc. Additionally, the display of the MSMA communication device 900 need not have touch screen capability.

The MSMA communication device 900 may have one or more cellular network transceivers 908a, 908b coupled to the processor 902 and to two or more antennae 910, 911 and configured for sending and receiving cellular communications. The transceivers 908a, 908b and antennae 910, 911 may be used with the above-mentioned circuitry to implement the various embodiment methods. The MSMA communication device 900 may include two or more SIM cards 916a, 916b coupled to the transceivers 908a, 908b and/or the processor 902 and configured as described above. The MSMA communication device 900 may include a cellular network wireless modem chip 917 that enables communication via a cellular network and is coupled to the processor.

The MSMA communication device 900 may also include speakers 914 for providing audio outputs. The MSMA communication device 900 may also include a housing 920, constructed of a plastic, metal, or a combination of materials, for containing all or some of the components discussed herein. The MSMA communication device 900 may include a power source 922 coupled to the processor 902, such as a disposable or rechargeable battery. The rechargeable battery may also be coupled to the peripheral device connection port to receive a charging current from a source external to the MSMA communication device 900. The MSMA communication device 900 may also include a physical button 924 for receiving user inputs. The MSMA communication device 900 may also include a power button 926 for turning the MSMA communication device 900 on and off.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more processor executable instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to some embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method implemented on a multi-Subscriber-Identity-Module (SIM), multi-active communication device for managing services of at least one of a plurality of subscriptions that utilize a plurality of radio-frequency (RF) chains, comprising:
    determining whether a service of a second subscription that is associated with a first RF chain is preempting or will preempt a service of a first subscription on the first RF chain;
    determining whether there is another service on a second RF chain that is available as a substitute for the preempted service of the first subscription in response to determining that a service of the second subscription that is associated with the first RF chain is preempting or will preempt a service of the first subscription on the first RF chain; and
    configuring the first subscription to acquire the substitute service on the second RF chain in response to determining that there is another service on the second RF chain that is available as a substitute for the preempted service of the first subscription.

2. The method of claim 1, wherein:
    the first subscription receives different data services from each of the first RF chain and the second RF chain; and
    the first subscription receives voice service from the second RF chain.

3. The method of claim 1, further comprising:
    determining whether the preempted service of the first subscription may resume on the first RF chain; and
    configuring the first subscription to reacquire the preempted service on the first RF chain in response to determining that the preempted service of the first subscription may resume on the first RF chain.

4. The method of claim 3, wherein configuring the first subscription to reacquire the preempted service on the first RF chain comprises:
    waiting for a predetermined period of time in response to determining that the preempted service of the first subscription may resume on the first RF chain;
    determining whether the preempted service has or will become preempted again after waiting for the predetermined period of time; and
    configuring the first subscription to reacquire the preempted service on the first RF chain in response to determining that the preempted service is not and will not become preempted again after waiting for the predetermined period of time.

5. The method of claim 1, wherein determining whether there is another service on a second RF chain that is available as a substitute for the preempted service of the first subscription comprises:
    determining an operational state for each of the first RF chain and the second RF chain; and
    performing a lookup in a table of services available on the second RF chain based on the operational states of the first RF chain and the second RF chain and the services associated with the second RF chain.

6. The method of claim 5, further comprising:
    determining whether there is another service associated with the second RF chain that is available as a substitute for the preempted service of the first subscription based on the table lookup; and
    configuring the first subscription to acquire the substitute service on the second RF chain in response to determining that there is another service associated with the second RF chain that is available as a substitute for the preempted service of the first subscription based on the table lookup.

7. The method of claim 5, further comprising:
    determining whether there is another service associated with the second RF chain that is available as a substitute for the preempted service of the first subscription based on the table lookup;
    determining whether the second RF chain is already configured to provide the substitute service; and
    configuring the first subscription to acquire the substitute service on the second RF chain in response to determining that there is another service associated with the second RF chain that is available as a substitute for the preempted service of the first subscription based on the table lookup and the second RF chain is already configured to provide the substitute service.

8. The method of claim 7, further comprising:
    determining whether the service of the second subscription that is associated with a first RF chain is estimated to preempt the service of the first subscription on the first RF chain for longer than a time duration threshold in response to determining that the second RF chain is not already configured to provide the substitute service; and
    configuring the first subscription to acquire the substitute service on the second RF chain in response to determining that the service of the second subscription that is associated with a first RF chain is estimated to preempt the service of the first subscription on the first RF chain for longer than the time duration threshold.

9. A multi-Subscriber-Identity-Module (SIM), multi-active mobile communication device, comprising:
a first radio-frequency (RF) chain;
a second RF chain; and
a processor coupled to the first RF chain and the second RF chain, wherein the processor is configured with processor executable instructions to:
determine whether a service of a second subscription that is associated with the first RF chain is preempting or will preempt a service of a first subscription on the first RF chain;
determine whether there is another service on the second RF chain that is available as a substitute for the preempted service of the first subscription in response to determining that a service of the second subscription that is associated with the first RF chain is preempting or will preempt a service of the first subscription on the first RF chain; and
configure the first subscription to acquire the substitute service on the second RF chain in response to determining that there is another service on the second RF chain that is available as a substitute for the preempted service of the first subscription.

10. The multi-SIM, multi-active mobile communication device of claim 9, wherein:
the first subscription receives different data services from each of the first RF chain and the second RF chain; and
the first subscription receives voice service from the second RF chain.

11. The multi-SIM, multi-active mobile communication device of claim 9, wherein the processor is further configured with processor executable instructions to:
determine whether the preempted service of the first subscription may resume on the first RF chain; and
configure the first subscription to reacquire the preempted service on the first RF chain in response to determining that the preempted service of the first subscription may resume on the first RF chain.

12. The multi-SIM, multi-active mobile communication device of claim 11, wherein the processor is further configured with processor executable instructions to configure the first subscription to reacquire the preempted service on the first RF chain by:
waiting for a predetermined period of time in response to determining that the preempted service of the first subscription may resume on the first RF chain;
determining whether the preempted service has or will become preempted again after waiting for the predetermined period of time; and
configuring the first subscription to reacquire the preempted service on the first RF chain in response to determining that the preempted service is not and will not become preempted again after waiting for the predetermined period of time.

13. The multi-SIM, multi-active mobile communication device of claim 9, wherein the processor is further configured with processor executable instructions to determine whether there is another service on a second RF chain that is available as a substitute for the preempted service of the first subscription by:
determining an operational state for each of the first RF chain and the second RF chain; and performing a lookup in a table of services available on the second RF chain based on the operational states of the first RF chain and the second RF chain and the services associated with the second RF chain.

14. The multi-SIM, multi-active mobile communication device of claim 13, wherein the processor is further configured with processor executable instructions to:
determine whether there is another service associated with the second RF chain that is available as a substitute for the preempted service of the first subscription based on the table lookup; and
configure the first subscription to acquire the substitute service on the second RF chain in response to determining that there is another service associated with the second RF chain that is available as a substitute for the preempted service of the first subscription based on the table lookup.

15. The multi-SIM, multi-active mobile communication device of claim 13, wherein the processor is further configured with processor executable instructions to:
determine whether there is another service associated with the second RF chain that is available as a substitute for the preempted service of the first subscription based on the table lookup;
determine whether the second RF chain is already configured to provide the substitute service; and
configure the first subscription to acquire the substitute service on the second RF chain in response to determining that there is another service associated with the second RF chain that is available as a substitute for the preempted service of the first subscription based on the table lookup and the second RF chain is already configured to provide the substitute service.

16. The multi-SIM, multi-active mobile communication device of claim 15, wherein the processor is further configured with processor executable instructions to:
determine whether the service of the second subscription that is associated with a first RF chain is estimated to preempt the service of the first subscription on the first RF chain for longer than a time duration threshold in response to determining that the second RF chain is not already configured to provide the substitute service; and
configure the first subscription to acquire the substitute service on the second RF chain in response to determining that the service of the second subscription that is associated with a first RF chain is estimated to preempt the service of the first subscription on the first RF chain for longer than the time duration threshold.

17. A multi-Subscriber-Identity-Module (SIM), multi-active mobile communication device, comprising:
means for determining whether a service of a second subscription that is associated with a first RF chain is preempting or will preempt a service of a first subscription on the first RF chain;
means for determining whether there is another service on a second RF chain that is available as a substitute for the preempted service of the first subscription in response to determining that a service of the second subscription that is associated with the first RF chain is preempting or will preempt a service of the first subscription on the first RF chain; and
means for configuring the first subscription to acquire the substitute service on the second RF chain in response to determining that there is another service on the second RF chain that is available as a substitute for the preempted service of the first subscription.

18. A non-transitory processor-readable storage medium having stored thereon processor-executable instructions configured to cause a processor to perform operations for managing services of at least one of a plurality of subscriptions that utilize a plurality of radio-frequency (RF) chains, the operations comprising:
   determining whether a service of a second subscription that is associated with a first RF chain is preempting or will preempt a service of a first subscription on the first RF chain;
   determining whether there is another service on a second RF chain that is available as a substitute for the preempted service of the first subscription in response to determining that a service of the second subscription that is associated with the first RF chain is preempting or will preempt a service of the first subscription on the first RF chain; and
   configuring the first subscription to acquire the substitute service on the second RF chain in response to determining that there is another service on the second RF chain that is available as a substitute for the preempted service of the first subscription.

19. The non-transitory processor-readable storage medium of claim 18, wherein:
   the first subscription receives different data services from each of the first RF chain and the second RF chain; and
   the first subscription receives voice service from the second RF chain.

20. The non-transitory processor-readable storage medium of claim 18, wherein the stored processor-executable instructions are configured to cause a processor to perform operations further comprising:
   determining whether the preempted service of the first subscription may resume on the first RF chain; and
   configuring the first subscription to reacquire the preempted service on the first RF chain in response to determining that the preempted service of the first subscription may resume on the first RF chain.

21. The non-transitory processor-readable storage medium of claim 20, wherein the stored processor-executable instructions are configured to cause a processor to perform operations such that configuring the first subscription to reacquire the preempted service on the first RF chain comprises:
   waiting for a predetermined period of time in response to determining that the preempted service of the first subscription may resume on the first RF chain;
   determining whether the preempted service has or will become preempted again after waiting for the predetermined period of time; and
configuring the first subscription to reacquire the preempted service on the first RF chain in response to determining that the preempted service is not and will not become preempted again after waiting for the predetermined period of time.

22. The non-transitory processor-readable storage medium of claim 18, wherein the stored processor-executable instructions are configured to cause a processor to perform operations such that determining whether there is another service on a second RF chain that is available as a substitute for the preempted service of the first subscription comprises:
   determining an operational state for each of the first RF chain and the second RF chain; and
   performing a lookup in a table of services available on the second RF chain based on the operational states of the first RF chain and the second RF chain and the services associated with the second RF chain.

23. The non-transitory processor-readable storage medium of claim 22, wherein the stored processor-executable instructions are configured to cause a processor to perform operations further comprising:
   determining whether there is another service associated with the second RF chain that is available as a substitute for the preempted service of the first subscription based on the table lookup; and
   configuring the first subscription to acquire the substitute service on the second RF chain in response to determining that there is another service associated with the second RF chain that is available as a substitute for the preempted service of the first subscription based on the table lookup.

24. The non-transitory processor-readable storage medium of claim 22, wherein the stored processor-executable instructions are configured to cause a processor to perform operations further comprising:
   determining whether there is another service associated with the second RF chain that is available as a substitute for the preempted service of the first subscription based on the table lookup;
   determining whether the second RF chain is already configured to provide the substitute service; and
   configuring the first subscription to acquire the substitute service on the second RF chain in response to determining that there is another service associated with the second RF chain that is available as a substitute for the preempted service of the first subscription based on the table lookup and the second RF chain is already configured to provide the substitute service.

25. The non-transitory processor-readable storage medium of claim 24, wherein the stored processor-executable instructions are configured to cause a processor to perform operations further comprising:
   determining whether there is another service associated with the second RF chain that is available as a substitute for the preempted service of the first subscription based on the table lookup;
   determining whether the second RF chain is already configured to provide the substitute service; and
   configuring the first subscription to acquire the substitute service on the second RF chain in response to determining that there is another service associated with the second RF chain that is available as a substitute for the preempted service of the first subscription based on the table lookup and the second RF chain is already configured to provide the substitute service.

* * * * *